(No Model.)
H. A. REINHOLD.
VEHICLE WHEEL.
No. 430,687. Patented June 24, 1890.
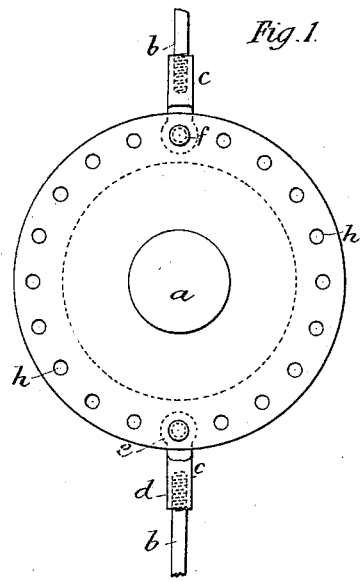
Fig. 1.
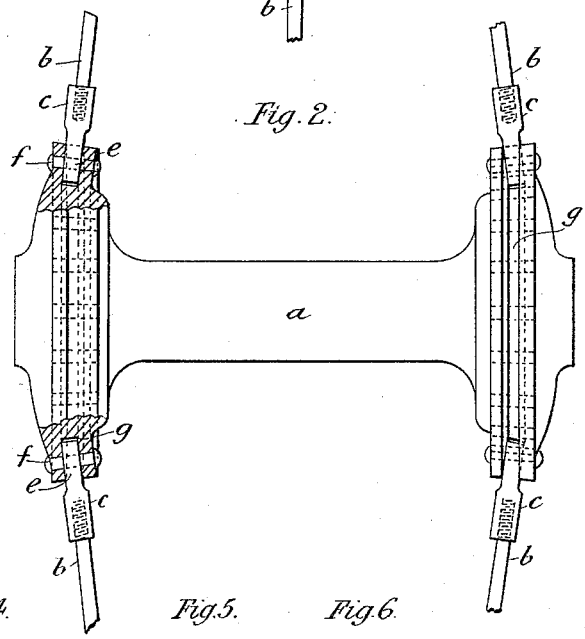
Fig. 2.
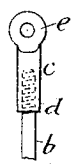  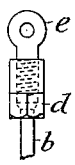  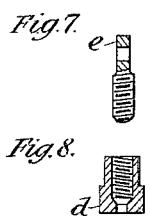
Fig. 3. Fig. 4. Fig. 5. Fig. 6. Fig. 7. Fig. 8.
Witnesses:
Inventor:
Hermann Adolph Reinhold
By John J. Halsted & Son
his attys

UNITED STATES PATENT OFFICE.

HERMANN ADOLPH REINHOLD, OF WOOLWICH, ENGLAND.

VEHICLE-WHEEL.

SPECIFICATION forming part of Letters Patent No. 430,687, dated June 24, 1890.

Application filed May 29, 1889. Serial No. 312,619. (No model.)

*To all whom it may concern:*

Be it known that I, HERMANN ADOLPH REINHOLD, a subject of the Queen of Great Britain, residing at Woolwich, England, have invented new and useful Improvements in Wheels chiefly designed for Velocipedes, of which the following is a specification.

My invention relates to wheels of that class known as "tension-wheels," and chiefly designed for velocipedes. In wheels of this class as heretofore constructed the spokes frequently break, owing to the fact that they are rigidly screwed into or attached to the hub.

The chief object of my invention is to obviate this breakage; and to this end I attach the spokes to the hub by loose connections, so that any strain applied to the hub will be equally divided between the spokes, whereby no undue strain will be felt by any one spoke.

In the accompanying drawings, Figure 1 is an end view of a wheel-hub adapted to have the spokes connected thereto according to my invention, portions of some of the spokes being shown; and Fig. 2 is a side view of the same partly in section. Figs. 3 and 4 are side and edge elevations, respectively, of a detail. Figs. 5 and 6 are views similar to Figs. 3 and 4, respectively, illustrating a modification of the said invention; and Figs. 7 and 8 are sectional views of details.

Similar letters of reference indicate corresponding parts in the several figures.

$a$ is the wheel-hub, and $b\ b$ are the spokes. $c\ c$ are nipples, one of which is used in conjunction with each spoke. As shown in Figs. 1 to 4, each nipple is formed with an internally screw-threaded socket $d$, which is adapted to receive the end of a spoke, and with an eye $e$, through which a pin $f$ can be passed to secure it to the hub.

In order to apply the nipples to the hub, I form circumferential slots or grooves $g$ in the peripheries of the flanges of the said hub, the said slots or grooves being at an angle corresponding to a line extending from the center of the wheel-rim to the centers of the flanges, as shown in Fig. 2. This angle, however, will vary according to the diameter of the wheel to which my improvements are applied. Around the flanges are formed holes $h\ h$, into which pins or screws which hold the nipples in place can be passed.

In the modification of my invention (shown in Figs. 5 to 8) the nipple $c$ is formed in two parts, the eye portion of which is adapted to screw into the socket portion. In this case the opening through the socket is contracted at one end, as shown in Fig. 8, and the spoke is provided with a head, as shown in Figs. 5 and 6, to prevent it from slipping out of the socket. The socket is also provided with a nut to enable the same to be turned to tighten the spoke.

A wheel built on this plan gives direct and equal strain to each spoke, as the spokes being hinged at the point where they receive their power give to every thrust of the pedal, keeping the strain of the spokes in a direct line, whereas in an ordinary wheel every vibration is felt at the points where the spokes are screwed into the boss, at which points they usually get loose or break off.

A great advantage of my invention, in addition to those before indicated, is that if a spoke accidentally breaks or becomes damaged it may be readily replaced without injury to the hub.

I claim—

1. In a wheel of the kind described, the combination of a threaded nipple, a threaded spoke screwing into said nipple, a hub having an annular recess, and a pin connecting the hub and nipple, substantially as described.

2. In a tension-wheel, the combination, with the removable spokes $b$, of the internally screw-threaded nipple $c$, connected thereto, and the hub $a$, the latter being provided with the inclined groove $g$ and with holes $h$, as set forth, said nipples entering said groove and having each an eye $e$ and a pin $f$, which secures it to the hub through such eye, the combination serving by means of the loose connections to divide equally among the spokes the strain applied to the hub.

HERMANN ADOLPH REINHOLD.

Witnesses:
G. F. REDFERN,
*Patent Agent, 4 South Street, Finsbury, London.*
A. S. ALBUTT.